United States Patent [19]

Steger

[11] 4,235,391
[45] Nov. 25, 1980

[54] LOCKBAR RELEASE FOR INERTIA LOCKING SEAT BELT RETRACTOR

[75] Inventor: Charles B. Steger, Warren, Mich.

[73] Assignee: General Motors Corporation, Detroit, Mich.

[21] Appl. No.: 93,937

[22] Filed: Nov. 13, 1979

[51] Int. Cl.³ ...................... A62B 35/02; B65H 75/48
[52] U.S. Cl. ............................... 242/107.4 A; 280/806
[58] Field of Search .................. 242/107.4 R–107.4 E; 280/801–808; 297/469, 475–480

[56] References Cited

U.S. PATENT DOCUMENTS

| 2,708,555 | 5/1955 | Heinemann et al. | 242/107.4 A |
| 3,312,451 | 4/1967 | Davis | 242/107.4 R X |
| 3,503,571 | 3/1970 | Martin | 242/107.4 A |
| 3,692,328 | 9/1972 | Arlauskas et al. | 280/803 |
| 3,771,814 | 11/1973 | Hahn | 242/107.4 R X |
| 4,040,645 | 8/1977 | Giffen et al. | 242/107.4 A X |
| 4,090,735 | 5/1978 | Czernakowski | 242/107.4 A |

OTHER PUBLICATIONS

"Seat Belt Systems for the Future", E. Nichol Report on the Third International Technical Conference on Experimental Safety Vehicles, Wash., D.C., May 30–Jun. 2, 1972.

Primary Examiner—John M. Jillions
Attorney, Agent, or Firm—Charles E. Leahy

[57] ABSTRACT

A seat belt retractor has a belt reel rotatably mounted on the retractor housing for belt winding and unwinding rotation. A toothed ratchet plate is carried by the reel. A lockbar is pivotally mounted on a support link which is in turn pivotally mounted on the retractor housing. A latch lever is pivotally mounted on the housing and engages the support link to support the support link at a normal position establishing the lockbar in proximity with the ratchet plate for selective movement between locking and unlocking positions relative the ratchet plate. A handle or the like is associated with the latch lever whereby the occupant may forcibly disengage the latch lever from latching engagement with the support link thereby permitting the seat belt load imposed on the support link by the lockbar to pivot the support link away from the ratchet plate and thereby move the lockbar from the locking position to unlock the reel for a belt unwinding rotation. Springs are associated with the lockbar, the support link, and the latch lever to restore their normal positions.

1 Claim, 4 Drawing Figures

LOCKBAR RELEASE FOR INERTIA LOCKING SEAT BELT RETRACTOR

The invention relates to a seat belt retractor of the type in which an inertia sensing member engages a lockbar with a belt reel and more particularly to a mechanism by which the lockbar may be manually disengaged from the reel to permit belt unwinding.

BACKGROUND OF THE INVENTION

Vehicle occupant restraint belt retractors have heretofore been provided with an inertia responsive pendulum or the like for moving a lockbar into engagement with a toothed ratchet plate attached to the belt reel so that the occupant is restrained in the seat. The locking engagement between the lockbar and the ratchet plate teeth is effectively maintained for as long as an occupant restraining load is imposed on the belt even though the inertia stimulus is terminated. When the load is removed from the belt a slight belt rewinding rotation by a windup spring permits gravity to disengage the lockbar from the ratchet plate.

It is known to use the aforedescribed seat belt retractor in a seat belt system of the type having one end of the belt connected to the vehicle door so that the belt will be automatically moved to an unrestraining position when the door is opened and return to the restraining position when the door is closed. It has been recognized as desirable to provide a buckle in the belt so that the belt can be disconnected to permit opening of the door. In the alternative, it has been recognized as desirable to provide a handle or the like which is manually operable to forcibly disengage the lockbar from the ratchet plate so that the belt may be unwound from the reel to permit opening movement of the door.

Copending patent application Ser. No. 044,753, Bernard J. Finn et al. filed June 1, 1979, provides a collapsible support means which normally supports the lockbar in proximity with the ratchet plate and for movement between locking and unlocking positions and is collapsible to withdraw the lockbar from engagement with the ratchet plate. More particularly, the copending application provides a pivotally mounted support link which pivotally mounts the lockbar in an over-center position with respect to the pivot of the support link for withstanding loads imposed on the reel and an operator actuable handle for pivoting the support link to move the lockbar axis over-center to a collapsed position disengaging the lockbar to permit free belt unwinding rotation of the reel.

SUMMARY OF THE INVENTION

The present invention provides a new and improved manually operated mechanism by which the lockbar may be disengaged from locking engagement with the reel even while the weight of the occupant is imposed on the restraint belt.

According to the invention a seat belt retractor has a belt reel rotatably mounted on the retractor housing for belt winding and unwinding rotation. A toothed ratchet plate is carried by the reel. A lockbar is pivotally mounted on a support link which is in turn pivotally mounted on the retractor housing. A latch lever is pivotally mounted on the housing and engages the support link to support the support link at a normal position establishing the lockbar in proximity with the ratchet plate for selective movement between locking and unlocking positions relative the ratchet plate. A handle or the like is associated with the latch lever whereby the occupant may forcibly disengage the latch lever from latching engagement with the support link thereby permitting the seat belt load imposed on the support link by the lockbar to pivot the support link away from the ratchet plate and thereby move the lockbar from the locking positions to unlock the reel for a belt unwinding rotation. Springs are associated with the lockbar, the support link and the latch lever to restore their normal positions.

Accordingly, the feature, object and advantage of the invention resides in the mounting of the lockbar on a pivotal support link which is normally established in proximity with the ratchet plate by a latch lever selectively disengageable from the support link to permit the belt load to pivot the support link and lockbar away from the ratchet plate locking position.

BRIEF DESCRIPTION OF THE DRAWINGS

These and other objects, features and advantages of the invention will become apparent upon consideration of the specification and the appended drawings in which.

DESCRIPTION OF THE PREFERRED EMBODIMENT

Figure 1:
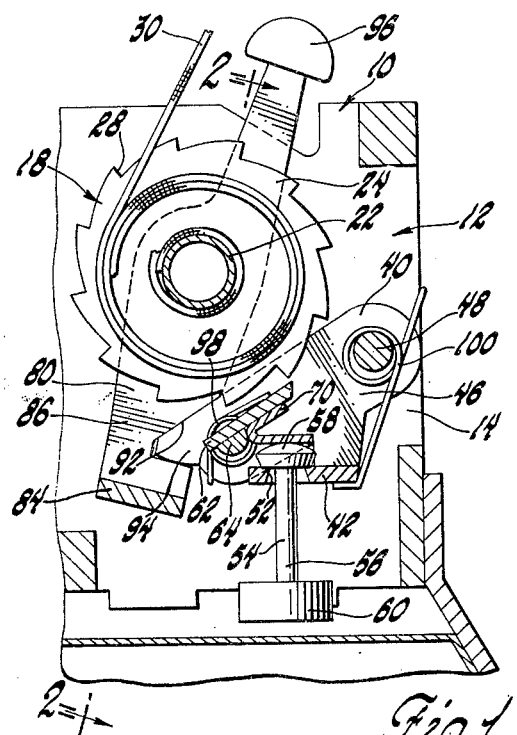
FIG. 1 is a side elevation sectional view of a seat belt retractor having the lockbar shown in the unlocked position.
Figure 2:
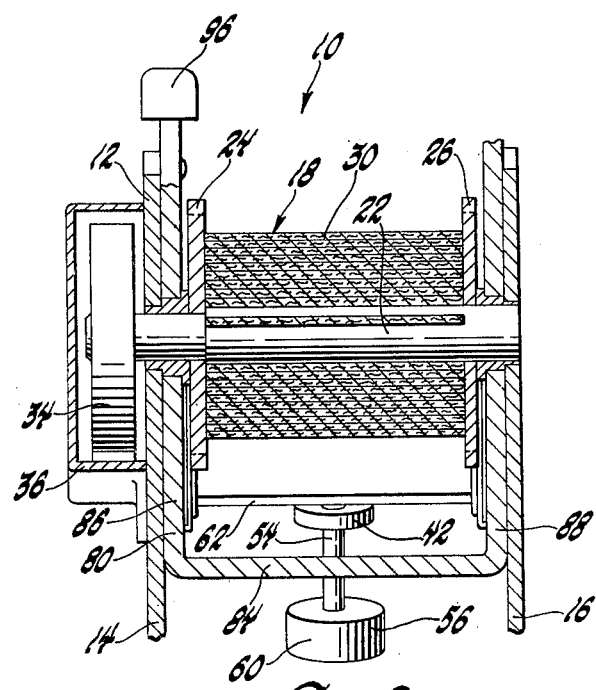
FIG. 2 is a sectional view taken in the direction of the areas of 2—2 of FIG. 1.

Referring to FIGS. 1 and 2 of the drawings, a vehicle occupant restraint belt retractor is generally indicated by 10 and includes a stamped metal retractor housing generally designated 12. The housing 12 includes a pair of spaced apart side walls 14 and 16. A belt reel generally designated 18 is rotatably mounted between the side walls 14 and 16 by a reel shaft 22. The belt reel 18 has spaced apart ratchet plates 24 and 26 having circumferentially spaced teeth 28. A restraint belt 30 is attached to the reel shaft 22 between the ratchet plates 24 and 26 and extends outwardly from the retractor for positioning across the seated occupant to provide a restraining function in the conventional manner.

The left hand end of the reel shaft 22 extends outwardly through the adjacent housing side wall 14 and is connected to the inner end of a windup spring 34. The outer end of windup spring 34 is suitably fixed to a spring cover 36 so that the reel 18 is normally biased in the belt winding direction to store the belt on the reel and hold the belt taut against the seated occupant. A support link 40, preferably of stamped steel construction, has a generally "U" shaped configuration including a base wall 42 which connects a pair of legs 46 juxtaposed respectively with the housing side walls 14 and 16. A pivot shaft 48 extends between the side walls 14 and 16 and through aligned apertures of the support link legs 46 to mount support link 40 for pivotal movement. The base 42 of the support link 40 has an aperture 52 which receives the stem 54 of a pendulum assembly 56. A cap portion 58 of the pendulum assembly 56 is supported on the base wall 42. A weight 60 is attached to the lower end of the stem 54. The pendulum 56 normally hangs in the vertical depending position of FIG. 1 but swings to the inclined position of FIG. 3 when a predetermined level of vehicle deceleration is experienced.

A lockbar 62 spans the distance between the side walls 14 and 16 and has pivot shafts 64 attached to the ends thereof and extending through aligned apertures in the side walls 14 and 16 to mount the lockbar for pivotal movement. A clip 70 is attached to the lockbar and rests upon the cap 58 of pendulum 56 to support the lockbar at the position of FIG. 1 in which the edge of the lockbar is spaced from the ratchet plates 24 and 26. A torsion spring acts between the lockbar 62 and the support link 40 to establish the lockbar 62 in the normal disengaged position of FIG. 1.

As best seen in FIGS. 1 and 2, a latch lever 80 is provided for establishing the support link in the normal position of FIG. 1. The latch lever 80 is a generally "U" shaped stamping including a base wall 84 and a pair of upstanding legs 86 and 88 which are juxtaposed with the housing side walls 14 and 16. The legs 86 and 88 have aligned apertures which receive the reel shaft 22 to mount the latch lever 80 for pivotal movement. The legs 86 and 88 have notches 92 which are adapted to receive projections 94 provided respectively on the legs 46 of support link 40. A spring, not shown, acts between the latch lever 80 and the housing 12 to urge the latch lever 80 to the normal position of FIG. 1 in which the support link projections 94 are received within the latch lever notches 92 to establish the support link 40 in the normal position of FIG. 1 wherein the lockbar 62 is established in locking proximity with the ratchet plates 24 and 26.

Figure 3:
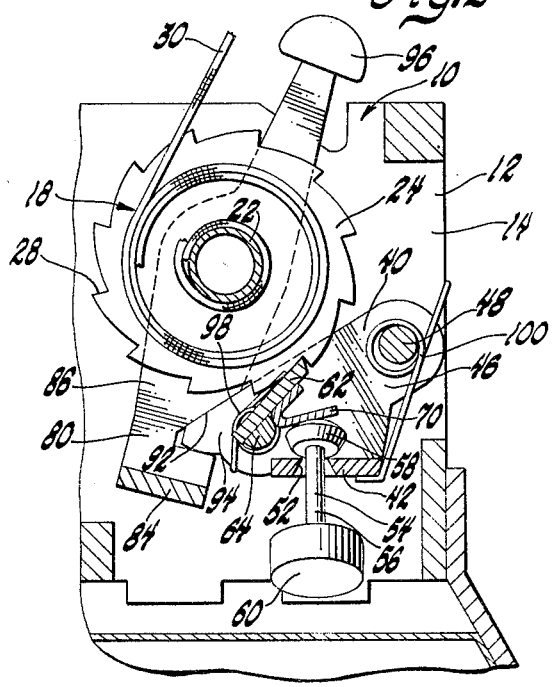
FIG. 3 is a view similar to FIG. 1 showing the lockbar moved into engagement with the reel by an inertia responsive pendulum.

Referring to FIG. 3 it is seen that a vehicle deceleration condition experienced by the vehicle tilts the pendulum 56 which in turn pivots the lockbar into engagement with the ratchet plates 24 and 26 to lock the reel 18 against belt unwinding rotation.

Upon termination of vehicle deceleration condition, the pendulum 56 will return from its tilted position of FIG. 3 to the normal vertical position of FIG. 1. Assuming that there is no occupant restraining load on the belt, the lockbar 62 will return to the position of FIG. 1. However, if the occupant weight remains on the belt, the locking interengagement between the lockbar 62 and the ratchet teeth 28 as shown in FIG. 2 will retain the lockbar 62 in the locking position whether or not the pendulum 56 may have returned to the normal vertical position of FIG. 1. Furthermore, the vehicle may come to rest at an unnatural attitude in which the force of gravity will tilt the pendulum 56 and cause the lockbar 62 to be engaged or remain in engagement with the ratchet teeth 28 even though there may be no occupant restraining load on the belt 30.

Figure 4:
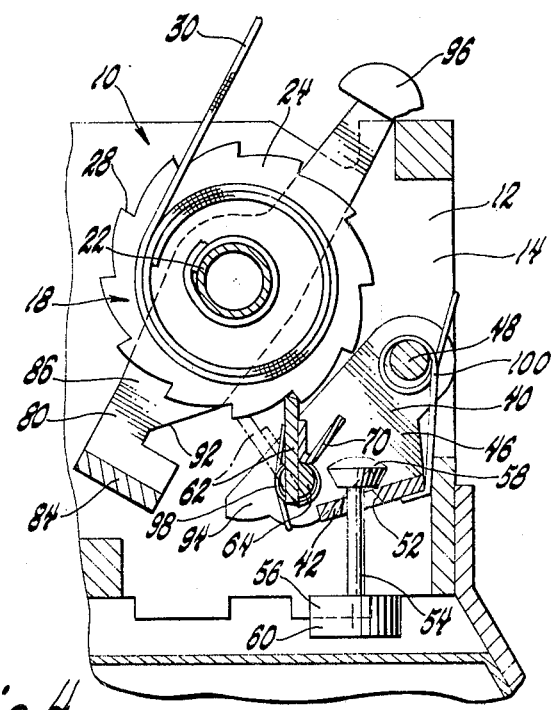
FIG. 4 is a view similar to FIGS. 1 and 3 but showing actuation of handle to disengage a latch lever from the lockbar support link to permit movement of the support link and lockbar away from the ratchet plate.

Referring to FIG. 3, it is seen that a handle 96 attached to the latch lever 80 may be rotated by the occupant in the clockwise direction in order to withdraw the notches 92 from supporting engagement with the projections 94 of the support link 40. Accordingly, the load imposed on the belt 30 acting on the lockbar 62 pivots the lockbar 62 from the solid line indicated position of FIG. 3 to the solid line and then the phantom line indicated position of FIG. 4 as permitted by pivotal movement of the support link 40 away from the ratchet plates 26 and 28. Accordingly, the belt 30 may be unwound from the reel 18 to permit opening of the door.

A subsequent rewinding of the belt 30 by the windup spring 34 permits a torsion spring 98 acting between the lockbar 62 and the support link 40 and a torsion spring 100 acting between support link 40 and housing 12 to return the lockbar 62 and the support link 40 to their normal positions of FIG. 1 in readiness for subsequent locking of the reel. Simultaneously the spring associated with the latch lever 80 returns the latch lever notches 92 into latching engagement with the support link projections 94.

Thus it is seen that the invention provides a new and improved manually operative mechanism by which a latch lever may be released from engagement of a pivotally mounted support link to thereby allow movement of a lockbar mounted on the support link away from latching engagement with the restraint belt reel.

While the invention has been disclosed primarily in terms of the specific embodiment shown in the drawings, it is not intended to be limited thereto, but rather only to the extent set forth in the appended claims. For example, it is within the scope of the invention to associate the handle 92 of the latch lever 80 with the handle 78 provided in U.S. Pat. No. 4,153,274, Lloyd W. Rogers, Jr. et al, filed May 8, 1979, so that travel of the handle beyond the degree of rotation employed to manually set a winding prevention mechanism is effective to disengage the latch lever from support of the support link 40.

The embodiments of the invention in which an exclusive property or privilege is claimed are defined as follows:

1. In a seat belt retractor having a belt reel journaled on a frame for belt winding and unwinding rotation, a ratchet plate carried by the reel, and a lockbar selectively movable between a locking position engaging the ratchet plate to lock the reel against belt unwinding reel rotation and an unlocking position disengaged from the ratchet plate to permit belt unwinding reel rotation, the improvement comprising:

a support link;

first pivot means mounting the lockbar on the support link for pivotal movement between the locking and unlocking positions;

second pivot means mounting the support link on the frame to permit pivotal movement of the support link between a normal position supporting the lockbar in proximity with the ratchet plate and a position away from the ratchet plate, the relationship between the first and second pivot means causing the belt loads to induce movement of the support link away from the ratchet plate;

latch means acting between the frame and the support link for latching the support link against belt loads acting thereon at the normal position supporting the lockbar in proximity with the ratchet plate for selective movement between the locking and unlocking positions; and means actuable to disengage the latch means from latching engagement with the support link whereby seat belt loads imposed on the support link via the lockbar are effective to pivot the support link about the second pivot means away from the ratchet plate and thereby move the lockbar from the locking position to unlock the reel for belt unwinding rotation.

* * * * *